April 6, 1926.

R. W. TULLY

APPARATUS FOR PRODUCING STEREOSCOPIC MOVING PICTURES

Filed Oct. 20, 1922

April 6, 1926. 1,579,974
R. W. TULLY
APPARATUS FOR PRODUCING STEREOSCOPIC MOVING PICTURES
Filed Oct. 20, 1922 3 Sheets-Sheet 2
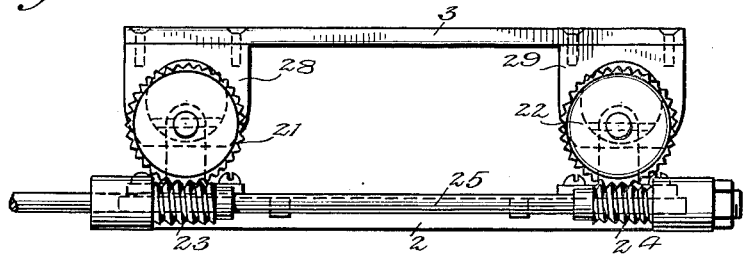
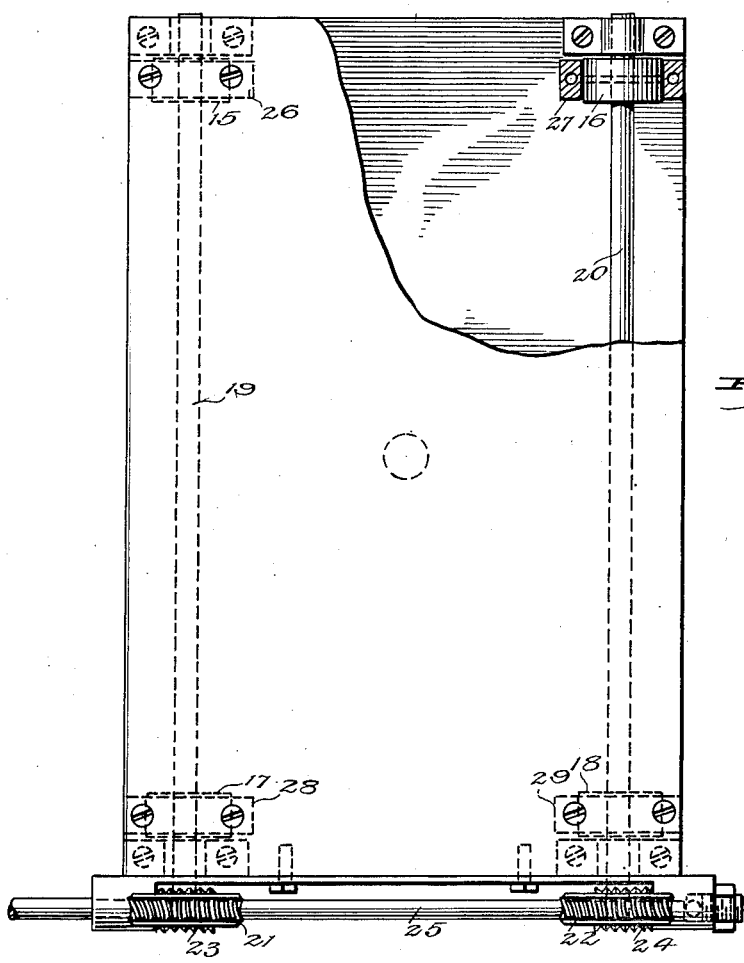
WITNESSES
INVENTOR
R. W. Tully
BY
ATTORNEYS April 6, 1926.  
R. W. TULLY  
1,579,974  
APPARATUS FOR PRODUCING STEREOSCOPIC MOVING PICTURES  
Filed Oct. 20, 1922  
3 Sheets-Sheet 3

Patented Apr. 6, 1926.

1,579,974

UNITED STATES PATENT OFFICE.

RICHARD WALTON TULLY, OF SIERRA MADRE, CALIFORNIA, ASSIGNOR TO CLAUS SPRECKELS, OF SAN DIEGO, CALIFORNIA.

APPARATUS FOR PRODUCING STEREOSCOPIC MOVING PICTURES.

Application filed October 20, 1922. Serial No. 595,820.

*To all whom it may concern:*

Be it known that I, RICHARD WALTON TULLY, a citizen of the United States, and a resident of Sierra Madre, in the county of Los Angeles and State of California, have invented a new and Improved Apparatus for Producing Stereoscopic Moving Pictures, of which the following is a full, clear, and exact description.

This invention relates to apparatus for producing stereoscopic moving pictures.

An object of the invention is to produce a series of pictures, such as a film of moving pictures, the negative of which upon development and printing as a positive may be projected from any ordinary machine with the result to the eye of the spectator of a stereoscopic or round effect of objects in the foreground or middle distance, together with the effect of deepening the point of perspective to its proper distance as though one were looking through a window instead of the present screen with its flatness and shortness of the point of perspective.

Another object is to provide a simple apparatus to be used in connection with an ordinary camera and an ordinary camera support without any material alteration of either one, which will permit the regular operation of the camera while so moving it or a part of it as to cause the type of negative above mentioned to be produced.

A further object is to obtain the above effect in a negative continuously and without interruption, so that whole scenes and complete reels or series of reels may have uniform value as to their stereoscopic effect.

A still further object is to so produce a stereoscopic effect in the eye of the beholder without tiring the eyes, an effect which has not thus far been produced.

The apparatus employed to achieve and apply my invention is illustrated in the drawings, of which—

Fig. 3 is an end view of a modified form of apparatus.

Fig. 4 is a plan view of the apparatus shown in Fig. 3.

Figure 1:
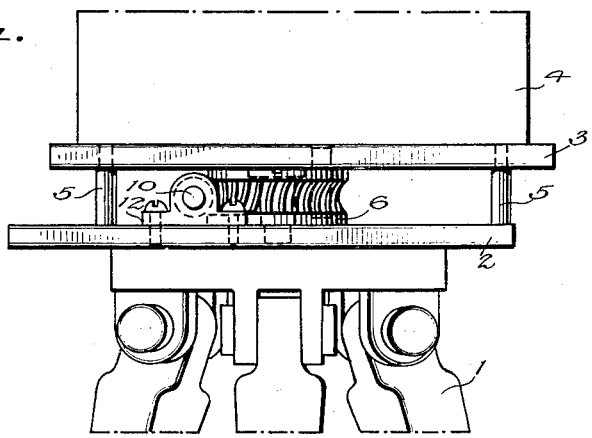
Figure 1 is a partial elevation of a camera tripod and support base for a camera with mechanism disposed in association therewith for producing the desired action.
Figure 2:
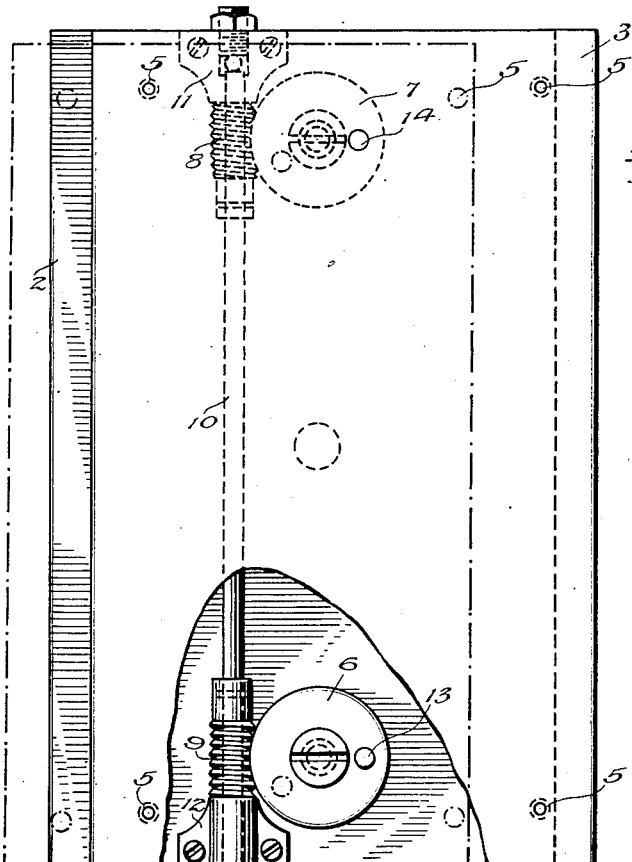
Fig. 2 is a plan view of the apparatus.

It is, of course, understood that in the practical application of the method and apparatus hereinafter set forth, the construction and arrangement of the parts and the character of the material used may be altered as desired to suit different requirements without departing from the spirit of the invention as set forth.

The invention in general relates to an apparatus for operating an ordinary moving picture camera which results in its being continuously and uninterruptedly moved or vibrated during the taking of pictures without any interruption to the taking of pictures. More particularly, the invention concerns the movement of the camera, or a part of the camera, such as the lens, in a regular cyclic path, which may be a curve of any kind or a straight line motion continuously and uninterruptedly, while the film is being run through the camera. Preferably the distance through which any part of the camera is moved is less than the average pupillary distance between the eyes of a person. By making the movement less than the pupillary distance of the eyes, the ordinary strain which has been felt by observers of stereoscopic pictures is eliminated, this strain having been due to the effort of the non-dominant eye to efface its background image. Whenever pictures are taken alternately from two points spaced a distance apart equal to the pupillary distance if the cameras representing the two eyes converge on a spot on the background, the foreground objects jump back and forth, there being no dominant eye; and if the cameras converge on the foreground, objects in the background jump back and forth and throw great strain on the eyes.

The main feature of my invention, therefore, is to produce a strain analogous to the strain produced now in the eyes of a person when focusing on a given object, and which strain is one of the necessary incidents to the stereoscopic effect produced in the mind of the observer. I produce this strain, however, only to a degree sufficient to produce a stereoscopic effect; and I have found that a slight strain is sufficient when combined with the fact that the number of pictures taken in a given interval of time are at least, if not more than, the number which must be thrown on the screen within the period of retentivity of the average eye. This method, therefore, employs a machine capable of producing, by substituting for one eye the permanency of vision described above, a slight irritation of the optic nerves of both eyes, considered as one eye, a strain similar to that resulting from the focusing of two eyes separately upon an object and the resultant strain on the optical nerves of both eyes by the struggle of the non-dominant eye to force its vision or else efface its vision to allow the dominant eye to carry the main brain picture of the object viewed.

Through the slight and continuous movement of the camera or the lens thereof, instead of considering both eyes as separate objects, I substitute for one eye the known phenomena of retentivity or permanence of vision. The camera acting for both eyes as one eye, the blur following the movement of the camera from an initial point representing, due to the phenomenon of permanency of vision, the blur of the other or non-dominant eye. As a consequence of this action, the same strain and confusion on the optic nerves of the observer is produced in both eyes considered as one by a slight movement as has been produced heretofore in the case of eyes or cameras set at the normal width apart. In the previous attempts to produce stereoscopic effects and which sought to imitate hand stereoscopes, the cameras or lenses have been separated by the width of the eyes and later either projected from the same disstance alternately or combined in various ways through laboratory manipulation of the negative or positive resulting therefrom.

In my invention, however, as shown in the drawings, I use an ordinary tripod 1 having the usual top plate 2. Spaced apart and above this top plate is a second plate 3 on which the camera box, represented by the numeral 4, may be in any manner fastened. The space distances between the two plates 2 and 3 are maintained by a plurality of pins or posts such as 5 which are readily fastened in the upper plate 3 and bear on the lower plate for sliding movement thereon. Connected to the lower plate 2 are a plurality of exteriorly mounted cams such as 6 and 7. These cams are toothed and adapted to mesh with worm gears 8 and 9 carried on a shaft 10 which extends between the two plates 2 and 3 and is connected to the lower plate by brackets 11 and 12. This shaft may be driven by any suitable source of power (not shown). The cams 6 and 7 are connected to the upper plate 3 by means of pins 13 and 14 the distance of which from the center of the cam or eccentrics can be made equal or may be made different, as desired. It will be noted that if the shaft 10 is rotated the operation of the cams 6 and 7 through the pins 13 and 14 will cause the upper plate to have a regular movement and, therefore, will subject the camera to this regular movement. If the distances of the pins 13 and 14 from the centers of rotation of the disks or cams 6 and 7 are equal, then the camera will be moved in a flat circle the radius of which will be the distance of the points 13 and 14 from the center of rotation of the cams or disks on which they are mounted. In other words, this particular kind of movement will be such that if the camera is pointed and focused at a given object, such as the vanishing point of perspective in the distance, then the axis of the lens during the regular movement of the camera will always be at any instant parallel to its original position. It is proposed to operate the shaft 9 at a fair rate of speed so that during the period of the persistence of vision, which is about $\frac{1}{16}$ of a second, the camera will have made at least a complete revolution and have returned to its starting point. If the circumstances require the camera to be moved faster, then more than one revolution will have been accomplished by the camera before this period elapses. It is understood, of course, that during the time the camera is moving through its curved path, the crank of the camera is being turned in the usual manner and generally at the usual rate of speed, so that pictures are continuously and uninterruptedly being taken. Therefore, during one revolution of the camera there are a plurality of pictures impressed on the negative, each taken from a different point in the camera's motion. In this particular form of the operative device, the motion of the camera, looking along the line of the axis of the lens, will be an oscillatory motion in a straight line, but looking down on the axis of the lens it would be circular. If it is desired at all times to maintain the camera pointed at a given spot in the distance, such as the vanishing point of perspective of a given object in the foreground or background, then the radius of the pin 14 which is fastened to the cam 7 and connects with the front portion of the plate 3 can be made slightly smaller than the radius of the pin 13 from its center of revolution. In this instance it will be understood that the angle of the axis of the camera will slightly and regularly vary as the camera is moved through its cyclic path. On the other hand it may be desired to reverse the relation of the radii and make the radius of the pin 14 greater than that of the pin 13.

In the case of this horizontal motion of the camera, where the radii of the two pins are slightly different, the axis of the lens describes a sort of triangle whose apex is the point at which the camera is constantly directed, and whose base describes a curve which may vary from oscillation backward and forward on a separate line or may be an ellipse of a circle. All these curves, however, lie in the same plane.

Figure 5:
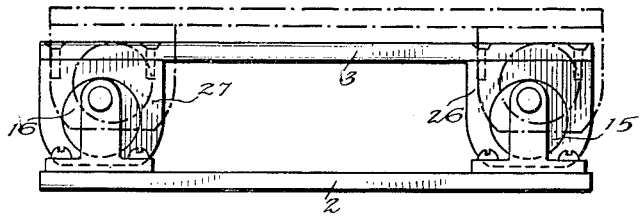
Fig. 5 is an end view of the apparatus shown in Fig. 4 viewed from the opposite end.

With respect to the motion of the camera, as shown in Figs. 3, 4 and 5, however, the plates 2 and 3 are provided as above described but the plate 3 is moved now by the engagement therewith of four cams or eccentric disks 15 and 16 disposed beneath the front of the plate, and 17 and 18 disposed at the rear of the plate 3. These disks or eccentrics are disposed beneath the corners of the plate. The disks 15 and 17 and 16 and 18 are mounted respectively on shafts 19 and 20. These shafts are provided respectively with worm gears 21 and 22 meshing with worms 23 and 24 on a shaft 25 driven as previously described by any suitable source of power (not shown). The eccentric disks are embraced by eccentric straps 26, 27, 28 and 29, and these straps are connected to the plate 3 on the under surface at the corners thereof. It will be understood that when the shaft 25 rotates, motion is given to the four eccentrics to raise and lower the plate 3. This forward and downward movement is also accompanied by a lateral movement so that any point in the plate 3 describes a curve. This curve is a circle if the eccentricity of each eccentric is the same as that of the other. However, these eccentrics may be regularly shaped to produce an elliptical motion for any particular point in the plate. Therefore, it will be understood that these eccentrics may be cam shaped to produce any desired motion of the upper plates however small or large, varying from vertical motion along a straight line through that of an ellipse and a circle to a sidewise movement along a straight line. The amount of motion may be varied, dependent upon the size of these cams or eccentrics, varying from a small fraction of an inch up to any point within the pupillary distance. Furthermore, by reducing the front cams or eccentrics 15 and 16 in size and throw with relation to those in the rear, such as 17 and 18, the direction of the axis of the lens of the camera can be changed so that it will always point at the same spot, which may, for instance, be the vanishing point of perspective in the distance, frequently called universal focus. In one type of machine built of this type, the eccentric or cam motion was 7/16ths of an inch, and the difference between the front and rear cams was about 4/1000ths of an inch, and in the operation of this machine a clear stereoscopic effect was produced. It must be noted that under this condition the axis of the lens extending from the film to the point in the distance will describe a surface of revolution generally conical, and the cross section of this conic section may be a straight line, either horizontal or vertical, or a circle, or an ellipse, of different axial dimensions. On the other hand, the cams may all be of the same size, in which event the axis of the lens will at all times be parallel to itself. Generally I use a lens which is capable of covering a considerably larger area on the film than is actually required for the purpose of reducing any shadow that may be run or formed around the edge of the projecting surfaces within the camera.

Therefore, it will be understood that in general my apparatus involves the use of a camera having a lens acting in place of two eyes and subjected, preferably, to some continuous, uninterrupted curved motion taking place at such speed that the permanency of vision of the observer's eye when the picture is projected will receive the impression within a given period of a series of pictures taken uninterruptedly of a given scene from a plurality of angles varying from each other only to a slight extent. In this manner it has been actually and satisfactorily demonstrated that a clear, well defined stereoscopic effect is produced without resulting in any appreciable tiring of the eyes of the observer.

Figure 6:
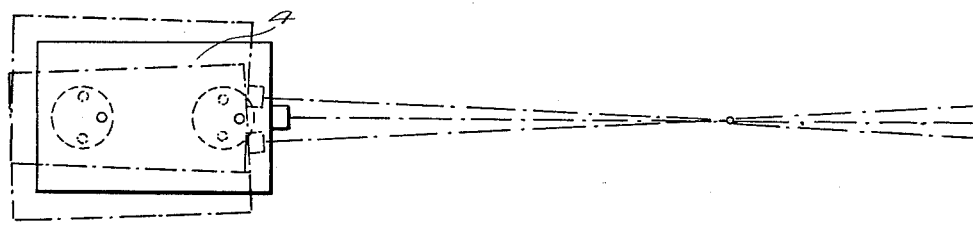
Figs. 6 and 7 are diagrammatic representations of the manner in which the apparatus operates.
Figure 7:
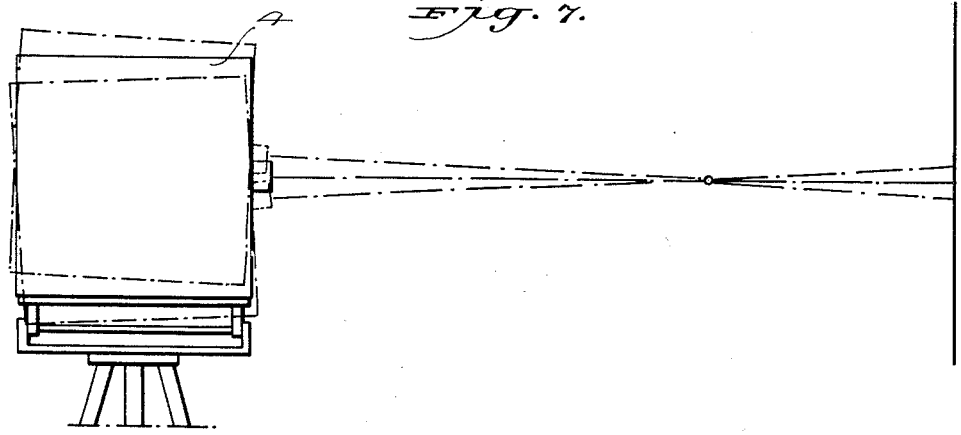

The diagrams in Figs. 6 and 7 merely illustrate, respectively, one form of motion of the camera as viewed from the top and from the side during the motion of the upper plate when the front cams are slightly smaller than the rear cams and when the camera is focused on a point between the camera and the extreme background.

What I claim is:—

1. An apparatus for producing stereoscopic motion pictures, which includes, in combination, a tripod having a top plate, a pair of spaced shafts mounted thereon and extending longitudinally thereof, gears on the rear ends of said shafts, a motor-operated shaft disposed adjacent the rear end of the tripod plate, gearing on said motor-operated shaft to engage with the gears on the first-mentioned shafts, cams on said first-mentioned shafts at the front and rear thereof, a camera-supporting plate, and straps on the underside of the camera supporting plate at the front and rear thereof, said straps encircling the cams, whereby the operation of the motor-operated shaft will cause the movement of the camera supporting plate.

2. An apparatus for producing stereoscopic motion pictures, which includes, in combination, a tripod having a top plate, a pair of spaced shafts mounted thereon and extending longitudinally thereof, gears on the rear ends of said shafts, a motor-operated shaft disposed adjacent the rear end of the tripod plate, gearing on said motor-operated shaft to engage with the gears on the first-mentioned shafts, cams on said first-mentioned shafts at the front and rear thereof, a camera supporting plate, and straps on the underside of the camera supporting plate at the front and rear thereof, said straps encircling the cams, whereby the operation of the motor-operated shaft will cause the movement of the camera supporting plate, the eccentricity of the cams at the front of the tripod plate being less than that of those at the rear, so that the motion of the camera supporting plate gives the axis of the camera lens a motion simulating a conic section.

RICHARD WALTON TULLY.